US007165908B2

(12) United States Patent
Liljedahl

(10) Patent No.: US 7,165,908 B2
(45) Date of Patent: Jan. 23, 2007

(54) ARRANGEMENT AT TELESCOPIC LIFTING BEAM

(75) Inventor: Gunnar Liljedahl, Luleå (SE)

(73) Assignee: Liko Research & Development AB, Lulea (SE)

( * ) Notice: Subject to any disclaimer, the term of this patent is extended or adjusted under 35 U.S.C. 154(b) by 0 days.

(21) Appl. No.: 10/450,534

(22) PCT Filed: Feb. 22, 2002

(86) PCT No.: PCT/SE02/00317

§ 371 (c)(1),
(2), (4) Date: Jun. 20, 2003

(87) PCT Pub. No.: WO02/079655

PCT Pub. Date: Oct. 10, 2002

(65) Prior Publication Data

US 2004/0037616 A1 Feb. 26, 2004

(30) Foreign Application Priority Data

Mar. 28, 2001 (SE) .................................. 0101099

(51) Int. Cl.
*F15B 15/16* (2006.01)
*F16M 11/28* (2006.01)

(52) U.S. Cl. ........................ 403/109.1; 403/377; 92/53

(58) Field of Classification Search ............ 403/109.1, 403/109.8, 377; 16/114.1, 429; 190/18 A, 190/115; 15/144.4; 254/51–53, 93 H, 93 R; 92/53; 464/162, 172; 212/304
See application file for complete search history.

(56) References Cited

U.S. PATENT DOCUMENTS 401,061 A * 4/1889 Pilon et al. ................ 403/377
1,088,743 A * 3/1914 Swinland .................... 403/377
1,705,625 A 3/1929 Mitchell .................. 403/109.1
1,839,309 A * 1/1932 Gundel ....................... 403/377
2,168,188 A * 8/1939 Bernhard .................... 403/377
2,245,899 A * 6/1941 Campbell .................... 16/429
2,565,730 A * 8/1951 Johnston et al. ............... 92/53
2,613,060 A * 10/1952 Trahan .................... 403/109.8
3,021,016 A * 2/1962 Noll et al. .................. 212/304
3,338,426 A * 8/1967 Grove ........................ 212/304
3,618,340 A * 11/1971 Geisthoff et al. ........... 464/172
3,622,124 A * 11/1971 Sidles et al. .............. 254/93 R (Continued)

FOREIGN PATENT DOCUMENTS

DE 2904072 A1 * 8/1980

(Continued)

*Primary Examiner*—Daniel P. Stodola
*Assistant Examiner*—Ernesto Garcia
(74) *Attorney, Agent, or Firm*—Jacobson Holman PLLC

(57) ABSTRACT

Two telescopic lifting beams are loaded in their protruded position and are driven from a retracted position to a protruded position. In order to improve the bending strength of the lifting beams, the lifting beams are surrounded by two telescopic tubes, one of the tubes being fixed to the outer end of the telescopic first lifting beam and is slideable on the second telescopic tube, which extends inwardly on the second lifting beam.

2 Claims, 2 Drawing Sheets

U.S. PATENT DOCUMENTS

| | | | | | |
|---|---|---|---|---|---|
| 3,749,430 | A | * | 7/1973 | Jenkins | 403/109.3 |
| 3,981,514 | A | * | 9/1976 | Visser | 280/765.1 |
| 4,062,156 | A | * | 12/1977 | Roth | 74/89.28 |
| 4,172,913 | A | * | 10/1979 | Ballah et al. | 403/109.8 |
| 4,652,024 | A | * | 3/1987 | Krohn | 15/144.4 |
| 4,979,598 | A | * | 12/1990 | Verheij et al. | 16/114.1 |
| 5,084,936 | A | * | 2/1992 | Thomas, Jr. | 92/53 |
| 5,553,350 | A | * | 9/1996 | Chang | 16/113.1 |
| 5,660,495 | A | * | 8/1997 | Atsukawa | 403/377 |
| 6,701,578 | B1 | * | 3/2004 | Lu | 16/429 |

FOREIGN PATENT DOCUMENTS

| | | | | |
|---|---|---|---|---|
| DE | 29501855 | U1 | | 1/1996 |
| FR | 801573 | A | * | 8/1936 |
| NL | 1001767 | | | 5/1997 |
| SE | 88803 | A | * | 3/1937 |

* cited by examiner

ARRANGEMENT AT TELESCOPIC LIFTING BEAM

FIELD OF THE INVENTION

This invention relates to an arrangement at at least two telescopically protrudable lifting beams, which are loaded in their protruded position and which are driven in an optional way from a retracted position to a protruded position.

BACKGROUND OF THE INVENTION

Lifting beams of this type are used, e.g. within the medical service for lifting means, when a person is being lifted from a sitting position to a standing position or from one place to another. Telescopic lifting beams of this kind are also used for other lifting purposes for patients.

The lifting beams are normally loaded in their longitudinal direction and they are designed to meet such a load. The lifting beams can be driven hydraulically via gears or manually using rope-driving means or with the help of a crank means.

SUMMARY OF THE INVENTION

It has now shown, e.g. within the medical service, that the lifting beams unintentionally have been loaded by bending when the telescopic beams are in their protruded position in relation to each other, which have lead to that the outer lifting beam has been bent in the area where it protrudes out of the outer end of the first lifting beam. The object of the invention is to increase the strength of the lifting beams when they are in their protruded position and that this is accomplished by simple means, which are cheap. The reinforcement is easy to apply on existing lifting beams without any complicated amendments of their design.

In order to reach this object the invention has been given the characteristics, which are stated in the following claims.

BRIEF DESCRIPTION OF THE DRAWINGS

An embodiment of the invention will now be described by reference to the drawings.

DETAILED DESCRIPTION OF THE PREFERRED EMBODIMENTS

Figure 1:
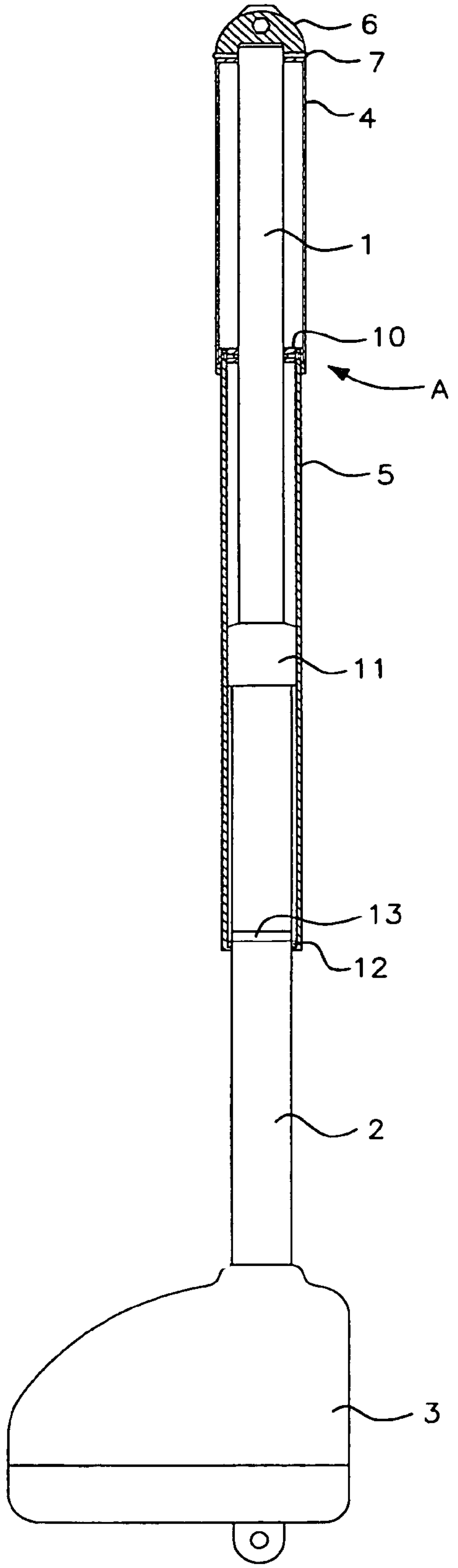
FIG. 1 is hereby a side view, partly in a longitudinal section, of two telescopic lifting beams in their protruded position.
Figure 2:
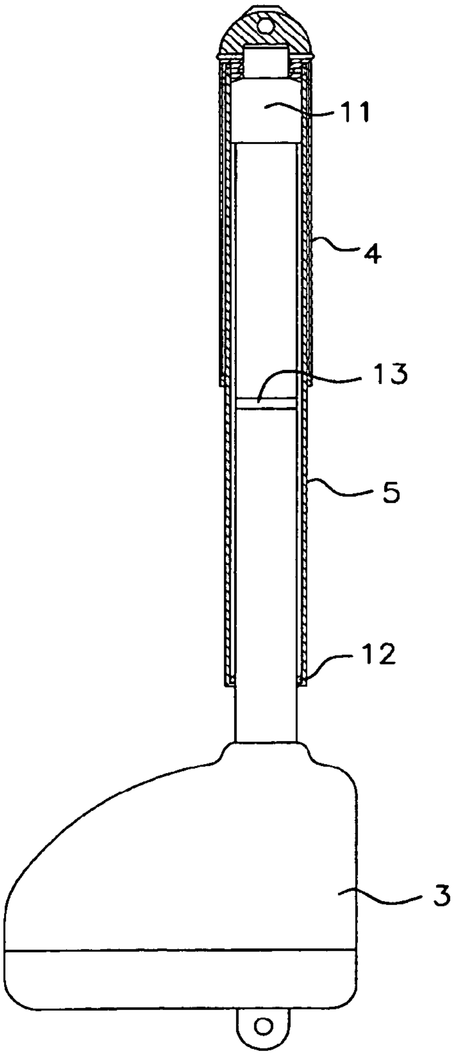
FIG. 2 is partly a longitudinal section of the telescopic beams in their retracted position.

The arrangement shown in FIGS. 1 and 2 comprises a first lifting beam 1, which is telescoping in a second lifting beam 2, being fixed to a driving means 3 which displaces the first lifting beam 1. The driving means 3 can be any known engine as e.g. a hydraulic engine or a gear motor, which drives the lifting beam 1 telescoping in the lifting beam 2. The lifting beams are loaded when the lifting beam 1 is protruding out of the lifting beam 2 in the position shown in FIG. 1. The lifting beams 1 and 2 are surrounded by two telescopic tubes 4 and 5, the first telescopic tube being displaceable over the second telescopic tube 5. FIG. 1 shows that the telescopic tubes 4 and 5 are in their most protruded position while FIG. 2 shows that the telescopic tube 4 is retracted on the second telescopic tube 5 over half of the length of the second telescopic tube 5. The first telescopic tube 4 is fixed to the outer end 6 of the first lifting beam 1 by an attachment 7. The telescopic tube 4 has a first coupling part 8 at its inner end, see FIG. 3. The second telescopic tube 5 has a second coupling part 9 at its outer end, see FIG. 3. The two coupling parts 8 and 9 work in such a way that when the telescopic tube 4 is moving with the telescoping beam 1, the coupling part 8 is hitched by the coupling part 9 so that the second telescopic tube 5 follows the first telescopic tube 4. When the telescopic tube 4 moves in the opposite direction, the coupling part 8 moves away from the coupling part 9 and the second telescopic tube 5 is pushed inwards on the second lifting beam 2 by that the attachment means 7 will abut the outer end of the second telescopic tube, see FIG. 3.

Figure 3:
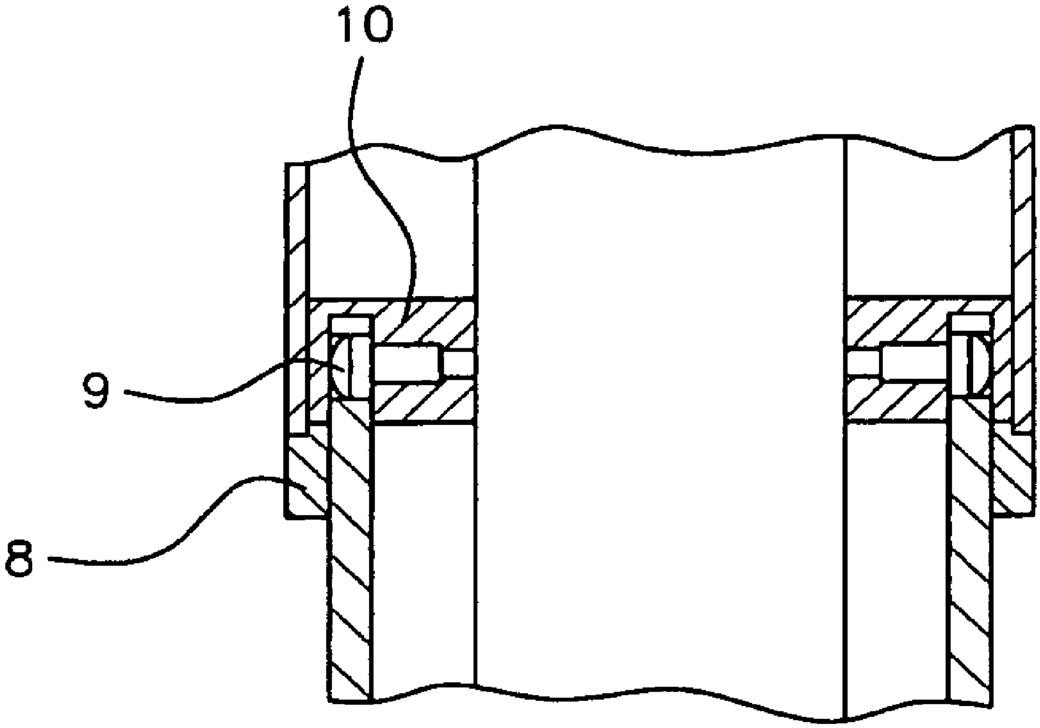
FIG. 3 is a longitudinal section of an area depicted by the arrow A in FIG. 1.

As can be seen from FIG. 3 there is a bearing ring 10 attached to the outer end of the second telescopic tube 5. The inner periphery of this bearing ring contacts the outside of the first lifting beam 1 and slides along the lifting beam 1. By this, the outer end of the second telescopic tube 5 is supported by the lifting beam 1. The lifting beam 2 has a bearing tube 11 at its outer end, the second telescopic tube 5 slides on the bearing tube 11. The second telescopic tube 5 has a bearing ring 12 at its inner end, which bearing ring slides with its inner periphery edge on the lifting beam 2. When the second telescopic tube 5 is in its protruded position according to FIG. 1, the telescopic tube 5 is stopped by a stop-ring 13, which is attached to the lifting beam 2. The stop ring may also serve as a guiding means for the second telescopic tube 5.

When the arrangement is in the position shown in FIG. 1, the second telescopic tube 5 will act as a support for the lifting beam 1 via three points. The first support point is in the area shown by arrow A, the second support point is in the area of the bearing tube 11 and the third support point is at the area of the second bearing ring 12. By this the lifting beam 1 will be reinforced against bending in the area of the tube 11.

The invention has been described above in connection with two telescopic lifting beams but the same reinforcement means can be arranged for e.g. three telescopic lifting beams. Further, there is a possibility to make the telescopic tube 5 sliding on the lifting beam 2 along its complete length, thus without the second bearing ring 12 and the tube 11, which means that according to FIG. 1 the telescopic tube slides with half of its length on the lifting beam 2. FIG. 1 also shows that the length of the first telescopic tube is about half the length of the first lifting beam in its protruded position while the second telescopic tube 5 has a length which corresponds to about half of the length of the second lifting beam 2. The length of the telescopic tubes may of course be arranged to what is needed but the important thing is that the second telescopic tube is of such a length that it supports the outer lifting beam at a point which is far away from the outer end of the inner lifting beam 2.

The invention claimed is:

1. A lifting apparatus comprising a first lifting beam, said first lifting beam being telescopable in a second lifting beam and being fixed to a driving means for driving said first lifting beam to and fro in relation to and inside said second lifting beam by being displaced from a retracted position to a protruded position by said driving means, said first lifting beam and said second lifting beam being surrounded by two telescopic tubes, an outer one of said two telescopic tubes being fixed to an outer end of said first lifting beam and telescoping over an inner one of said two telescopic tubes, which extends slidingly telescopically over said first lifting beam, a coupling between said two telescopic tubes consisting of a first part at an inner end of said outer tube and a second part at an outer end of said inner tube, said two parts being engaged when said tubes are drawn apart and are disengaged when said outer tube is retracted on said inner tube, and a bearing tube attached at the outer end of said second lifting beam on which said bearing tube said inner telescopic tube slides, a length of said outer tube corresponding to about half a length of said first lifting beam and a length of said inner tube is of such a length that said inner tube supports said first lifting beam at a point which is at a distance from the outer end of the second lifting beam when the first lifting beam is in a most protruded position.

2. Lifting apparatus according to claim 1, further comprising a bearing ring fixed to an inner end of said inner tube and sliding on said second lifting beam and forming a first part of another coupling, which limits displacement of said inner tube outwards on said second lifting beam by the bearing ring striking against a stop ring attached to the second lifting beam.

* * * * *